May 10, 1949.  E. F. STOREY  2,469,669
CRANKSHAFT BEARING LUBRICATION
Filed June 21, 1944
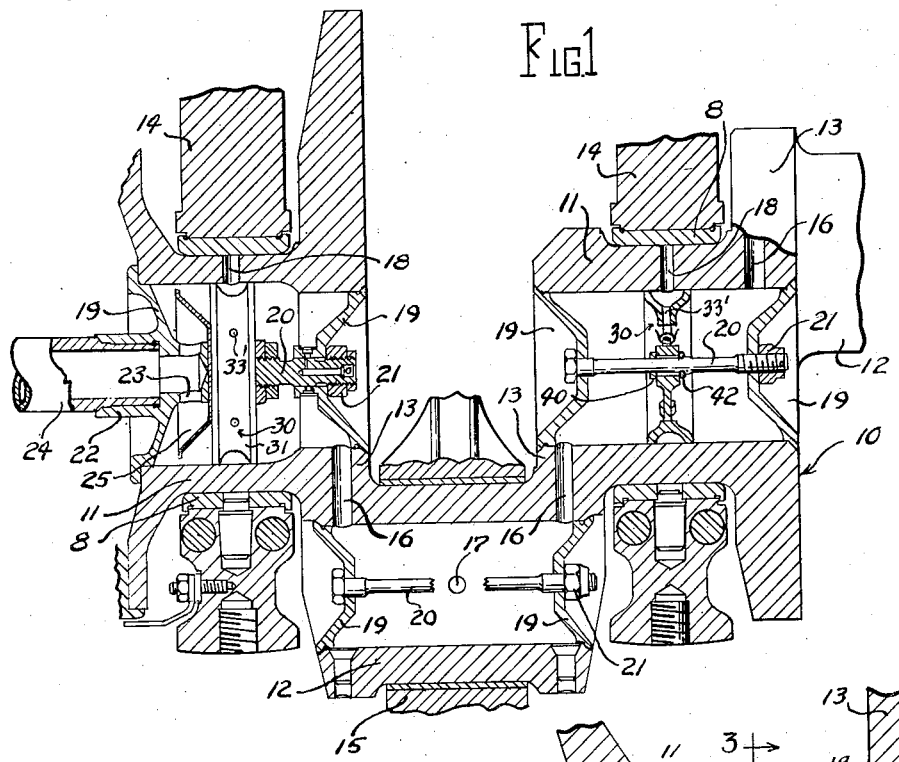
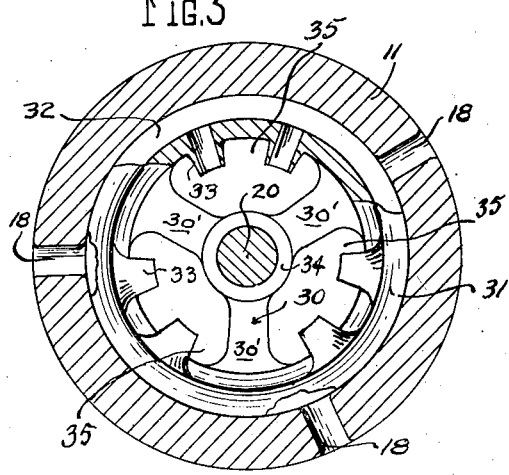
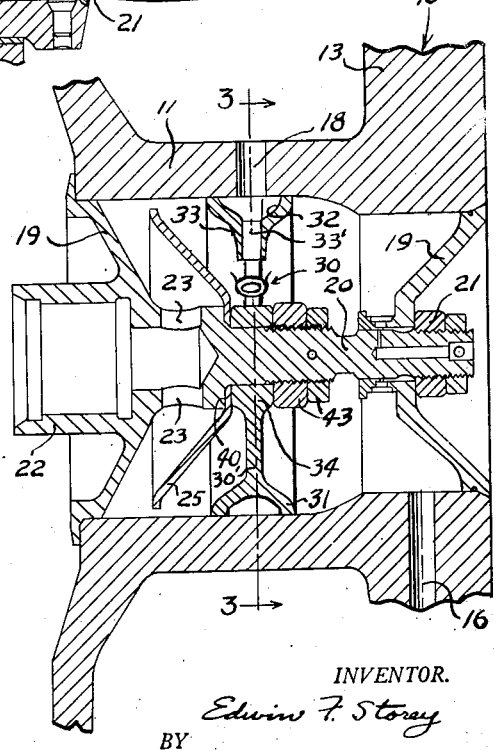
INVENTOR.
Edwin F. Storey
BY
Tibbetts & Hart
ATTORNEYS Patented May 10, 1949

2,469,669

UNITED STATES PATENT OFFICE 2,469,669

CRANKSHAFT BEARING LUBRICATION

Edwin F. Storey, Grosse Pointe Farms, Mich., assignor to Packard Motor Car Company, Detroit, Mich., a corporation of Michigan Application June 21, 1944, Serial No. 541,319

10 Claims. (Cl. 184—6)

1

This invention relates to engine crankshafts and particularly to the lubrication of crankshaft main bearings.

It is unavoidable, particularly in a new engine, that some foreign matter such as abrasive particles, filings, chips and dirt, will be picked up by the lubricating system and fed into the crankshaft bearings. In the main journals, the centrifugal force of the rotating crankshaft will cause a separation of the foreign matter causing it to be thrown against the inner walls of the hollow journals. The foreign material will either cling to the inner walls of the journals or move axially with the oil and if the radial outlet passages are left unprotected some of these foreign substances will enter the passages and be fed to the crankshaft bearings.

It is one of the objects of the present invention to provide such a crankshaft as described above with means for shielding the oil outlet passages from the foreign material referred to so that the foreign substances in the oil will either be pocketed against the walls of the hollow journals or flushed through the journals and caught by the usual screen or filter of the system.

Another object of the invention is to provide a removable shield and manifold for the lubricant outlet passages of a hollow crankshaft journal and one that is self-sealing in position in the hollow journal as it becomes heated by the lubricating oil passing through the crankshaft.

A further object of the invention is to provide a ready locating and holding means for a shield for the oil outlet passages in a hollow crankshaft journal.

Another object of the invention is to provide an annular shield and oil feeding manifold device for a plurality of radial oil outlet openings in a hollow crankshaft journal.

Other objects of the invention will appear from the following description taken in connection with the drawing, which forms a part of this specification, and in which:

Fig. 1 is a longitudinal sectional view of a portion of a crankshaft having the invention associated therewith;

Fig. 2 is an enlarged section of the crankshaft through the end bearing;

Fig. 3 is a section on line 3—3 of Fig. 2.

In the drawings, 10 indicates generally the front end portion of an engine crankshaft consisting of hollow main journals 11 and hollow crank pins 12 joined together by crank arms 13. The main journals are mounted in bearings 8 carried in supporting arms 14 of the crankcase

2 and the crank pins have connecting rods 15 mounted thereon.

Oil passages 16 are drilled in the crankshaft arms for connecting the interiors of the crank pins and main journals in series so that oil under pressure can flow through the crankshaft. The crank pins are provided with radial oil outlet passages 17 and the main crankshaft journals have one or more radial oil outlet passages 18, such main journal passages, when more than one, being substantially equidistant from one end of the journal. The ends of the hollow crank pins and main journals have closure disks 19 fitted therein and detachably secured in such position by tie bolts 20 and nuts 21.

The forward closure disk of the front main crankshaft journal (at the left in Fig. 1) is formed as an integral part of its tie bolt and has a hollow forward oil inlet extension 22. The bolt has a hollow portion and is formed with passages 23 providing communication between the interior of the bolt and the interior of the front main journal. A pressure lubricating system of a conventional type (not shown) is connected with the extension 22 by tube 24. A deflector 25 may be provided on the tie bolt in the interior of the front main journal to direct oil flowing through passages 23 against the inner wall of the journal in advance of outlet passages 18.

The crankshaft structure and the lubrication thereof so far described are conventional. The foreign particles, such as dirt, filings, etc., passing with the oil through the crankshaft main journals will be separated by centrifugal force and thrown against the inner walls of the journals and this foreign matter will either collect and cling to the walls or move axially through the journals past the oil outlet passages 18 under the influence of the movement of the circulating oil. Thus the foreign matter will either be pocketed in the journal or be flushed through.

Obviously, if the outlet passages 18 in the crankshaft main journals are not protected in some way a certain amount of the foreign matter will enter the passages and be fed to the bearings 8 where scoring and other damage will take place. Heretofore protection has been afforded by the insertion of stand pipes in the passages 18, these pipes extending inwardly so that the oil may enter them while the foreign matter largely passes to the other end of the journal. But the use of such stand pipes requires that the passages 18 be drilled out much larger than would otherwise be necessary, and since several of these passages are usually required for each journal, and all in the same transverse plane, the crankshaft is considerably weakened by reason thereof, and breakage will occur.

Under the present invention a combined shield and manifold is provided for the passages 18. This is in the form of a ring member 30 arranged transversely in each main journal. This ring member is formed with a peripheral groove or passage 32 which forms an oil manifold by reason of the engagement of its thin peripheral walls with the inner wall of the hollow journal in the zone of the oil outlets 18. The ring member has several inwardly extended bosses 33 having passages 33' connecting the manifold 32 with the interior of the hollow journal remote from the inner wall, or in other words, in the middle or central portion thereof so that the oil passing through the journal may enter the manifold through these passages 33 and yet the foreign substances will pass the bosses 33 by reason of the fact that such substances are held to the outer portion of the journal by centrifugal action of the rotating crankshaft.

The ring member 30 is formed with spaced spokes 30' leaving openings 35 between them and with a hub 34 by which it is supported on the bolt 20 previously referred to. The rim of the member is slightly smaller in diameter than the interior of the main journal when assembled axially therein and is formed of material, such as aluminum, that will expand radially sufficiently to cause the peripheral surface of the rim to engage and seal against the inner wall of the main journal in response to the higher temperature of the oil flowing through the crankshaft. The rim of the ring member is thus self-sealing with the main journal to form a shield and oil feeding manifold for the radial main journal outlet passages 18.

The ring member must be located axially of the main journals so that its peripheral passage 32 will overlie the radial outlet passages 18. The tie bolts 20 are formed with locating shoulders 40 for this purpose. The ring hub 34 is piloted on the tie bolt 20 and is held engaged against the locating shoulder by suitable means such as a snap ring 42 or nuts 43.

By this construction of ring manifold in the main journals the oil passages 18 may be made only large enough to provide the required amount of oil to the bearings and the ring manifolds because of their small area of contact may be made an easy, sliding fit in the drilled out portions of the journals so that they may be easily assembled and removed with the tie bolts 20 and closure disks 19, for cleaning. Yet, when in place these rings 30 will expand and make a tight fit in the hollow journals and thus properly function as shields for the oil outlets 18.

It will be understood that various forms of the invention other than that described above may be used without departing from the spirit or scope of the invention.

What is claimed is:

1. The combination with the hollow journal of a crankshaft having an oil feed thereto and a radial outlet passage therefrom, of a ring member within the hollow journal having a grooved rim sealed against the inner wall of the journal to form an annular manifold with which the radial outlet passage communicates, said rim having an oil inlet passage therethrough connecting the manifold with the interior of the journal remote from the inner wall thereof.

2. The combination with the hollow journal of a crankshaft having an oil feed leading thereto and a radial outlet passage therein, of means forming an annular manifold sealed against the inner wall of the journal in communication with the radial passage and with the interior of the journal.

3. The combination with the hollow journal of a crankshaft having an oil feed thereto and radial outlet passages therefrom, of a ring member in the hollow journal and having a rim with a peripheral groove forming with the journal wall an annular manifold located to enclose the inlet ends of the radial passages, said rim having an oil inlet passage open to the interior of the journal, said ring being formed of material radially expansible in response to the temperature of oil flowing into the journal to seal the periphery of the rim against the inner wall of the journal.

4. The combination with the hollow journal of a crankshaft having an oil feed thereto and a radial oil passage therefrom, of a ring member within the hollow journal having a grooved rim adapted to seal against the inner wall of the journal and having an oil passage connecting the groove in the rim with the interior of the journal, and means securing the ring member axially in the journal to locate the rim groove over the radial opening.

5. The combination with the hollow journal of a crankshaft having an oil feed at one end thereof and radial oil outlet passages therethrough between its ends, of a ring member within the journal having a rim engageable with the journal and having an annular peripheral groove forming a manifold open to the journal outlet openings and in communication with the interior of the journal radially inwardly from the inner surface of the journal, means piloting the ring member in the journal, and means on the pilot means for locating and securing the ring member axially in the journal.

6. The combination with the hollow journal of a crankshaft having an oil feed and radial oil outlet passages therethrough between its ends, of a ring member transversely arranged in the journal having a rim engageable with the journal, said rim having an annular peripheral groove forming a manifold open to the radial outlet openings and in communication with the interior of the journal radially inwardly from the inner surface of the journal, said ring member having a hub and openings through the portion connecting the hub with the rim, means piloting the ring member hub in the journal, and means for locating and securing the ring member axially in the journal.

7. The combination with the hollow journal of a shaft having an oil feed and radial outlet passages therethrough between its ends, of a ring member transversely arranged in the journal having a hub, a rim and spokes connecting the hub and rim, said rim having a grooved periphery engageable with the inner wall of the journal to form an annular manifold with which the radial passages communicate and the rim being formed of material expandable by the temperature of oil flowing through the journal and between the spokes to seal against the inner journal wall, and bosses between the spokes extending radially inward from the rim, the bosses and the rim forming inlet passages through which oil flows from the interior of the journals to the manifold.

8. The combination with the hollow journal of the crankshaft having an oil feed leading thereto and a radial outlet passage therein, of a ring member forming an annular manifold communicating with the radial passage and with the interior of the journal and having relatively thin peripheral walls in contact with the interior wall of the journal.

9. The combination with a crankshaft having a hollow journal and a radial oil outlet therein, of a closure disk at each end of the journal, a tie bolt connecting the closure disks, an annular shield for the outlet passage having only a small peripheral area of contact with the inner wall of the journal, and means connecting the shield to the tie bolt so that the shield may be assembled in and removed from the journal with the tie bolt.

10. The combination with the hollow journal of a crankshaft having a radial oil outlet passage, of a closure disk at each end of the journal, a tie bolt connecting the closure disks, a shield for the outlet passage having a sliding fit in the journal, said shield being appreciably shorter than the journal and out of contact with the closure disks, and means connecting the shield to the tie bolt for positioning the shield relative to the outlet passage and for assembly in and removal from the journal.

EDWIN F. STOREY.

REFERENCES CITED

The following references are of record in the file of this patent:

UNITED STATES PATENTS

| Number | Name | Date |
|---|---|---|
| 1,674,191 | Chilton | June 19, 1928 |
| 1,693,882 | Angle | Dec. 4, 1928 |
| 1,874,444 | Carvelli | Aug. 30, 1932 |
| 2,308,376 | Mader | Jan. 12, 1943 |

FOREIGN PATENTS

| Number | Country | Date |
|---|---|---|
| 219,890 | Great Britain | Aug. 7, 1924 |
| 598,610 | France | Oct. 2, 1925 |